(12) United States Patent
Wittkopp et al.

(10) Patent No.: US 8,016,709 B2
(45) Date of Patent: Sep. 13, 2011

(54) MULTI-SPEED TRANSMISSION HAVING THREE PLANETARY GEAR SETS

(75) Inventors: Scott H. Wittkopp, Ypsilanti, MI (US);
Andrew W. Phillips, Rochester, MI (US); James M. Hart, Belleville, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 12/351,565

(22) Filed: Jan. 9, 2009

(65) Prior Publication Data

US 2010/0179017 A1 Jul. 15, 2010

(51) Int. Cl.
*F16H 3/62* (2006.01)
(52) U.S. Cl. ......... 475/276; 475/275; 475/317; 475/330
(58) Field of Classification Search .................. 475/275, 475/276, 317, 330
See application file for complete search history.

(56) References Cited

U.S. PATENT DOCUMENTS

| | | | |
|---|---|---|---|
| 6,634,981 B1 | 10/2003 | Raghavan et al. | |
| 6,648,790 B2 | 11/2003 | Raghavan et al. | |
| 6,659,903 B1 | 12/2003 | Raghavan et al. | |
| 6,672,988 B1 | 1/2004 | Raghavan et al. | |
| 6,723,019 B2 * | 4/2004 | Lee et al. ........................ | 475/276 |
| 6,945,900 B2 * | 9/2005 | Usoro et al. ................... | 475/276 |
| 7,059,995 B2 | 6/2006 | Stevenson | |
| 7,140,996 B2 | 11/2006 | Tiesler et al. | |
| 2005/0130787 A1 * | 6/2005 | Usoro et al. ................... | 475/275 |

FOREIGN PATENT DOCUMENTS

| | | |
|---|---|---|
| JP | 61253224 | 11/1986 |
| JP | 01199035 | 8/1989 |

* cited by examiner

*Primary Examiner* — David D Le
*Assistant Examiner* — Huan Le

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

11 Claims, 2 Drawing Sheets

| GEAR STATE | GEAR RATIO | RATIO STEP | TORQUE TRANSMITTING ELEMENTS ||||||
|---|---|---|---|---|---|---|---|---|
| | | | 34 | 32 | 36 | 30 | 28 | 26 |
| Rev | -3.815 | | | | X | X | | |
| N | | -0.92 | | | | O | | |
| 1st | 4.160 | | | | | X | | X |
| 2nd | 2.215 | 1.88 | | X | | | | X |
| 3rd | 1.467 | 1.51 | | | X | | | X |
| 4th | 1.000 | 1.47 | | | | | X | X |
| 5th | 0.734 | 1.36 | | | X | | X | |
| 6th | 0.615 | 1.19 | | X | | | X | |
| 7th | 0.536 | 1.15 | X | | | | X | |

X= ON, CARRYING TORQUE
O= ON, NOT CARRYING TORQUE

FIG. 3

MULTI-SPEED TRANSMISSION HAVING THREE PLANETARY GEAR SETS

FIELD

The invention relates generally to a multiple speed transmission having a plurality of planetary gear sets and a plurality of torque transmitting devices and more particularly to a transmission having seven or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

In another embodiment of the transmission, the transmission has an input member, an output member, first, second, and third planetary gear sets. Each of the planetary gear sets has a sun gear, carrier and ring gear members. The input member is continuously interconnected to the sun gear member of the first planetary gear set and the output member is continuously interconnected to the ring gear member of the third planetary gear set.

Moreover, a first interconnecting member continuously interconnects the first member of the first planetary gear set with the second member of the second planetary gear set and the first member of the third planetary gear set. A second interconnecting member continuously interconnects the second member of the first planetary gear set with the third member of the second planetary gear set.

Additionally, a first torque transmitting mechanism is selectively engageable to interconnect the second member of the first planetary gear set with the second member of the third planetary gear set. A second torque transmitting mechanism is selectively engageable to interconnect the third member of the first planetary gear set with the second member of the third planetary gear set. A third torque transmitting mechanism is selectively engageable to interconnect the second member of the third planetary gear set with the stationary element. A fourth torque transmitting mechanism is selectively engageable to interconnect the second member of the second planetary gear set with the stationary element. A fifth torque transmitting mechanism is selectively engageable to interconnect at least one of the second member of the first planetary gear set and the third member of the second planetary gear set with the stationary element. A sixth torque transmitting mechanism is selectively engageable to interconnect the first member of the second planetary gear set with the stationary element. The torque transmitting mechanisms are selectively engageable in combinations of at least two to establish at least seven forward speed ratios and at least one reverse speed ratio between the input member and the output member.

Thus, it is an object of the present invention to provide a transmission having at least seven forward speeds and at least one reverse.

It is further an object of the present invention to provide a transmission having three planetary gear sets, a plurality of coupling members and a plurality of torque transmitting devices.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

Figure 1:
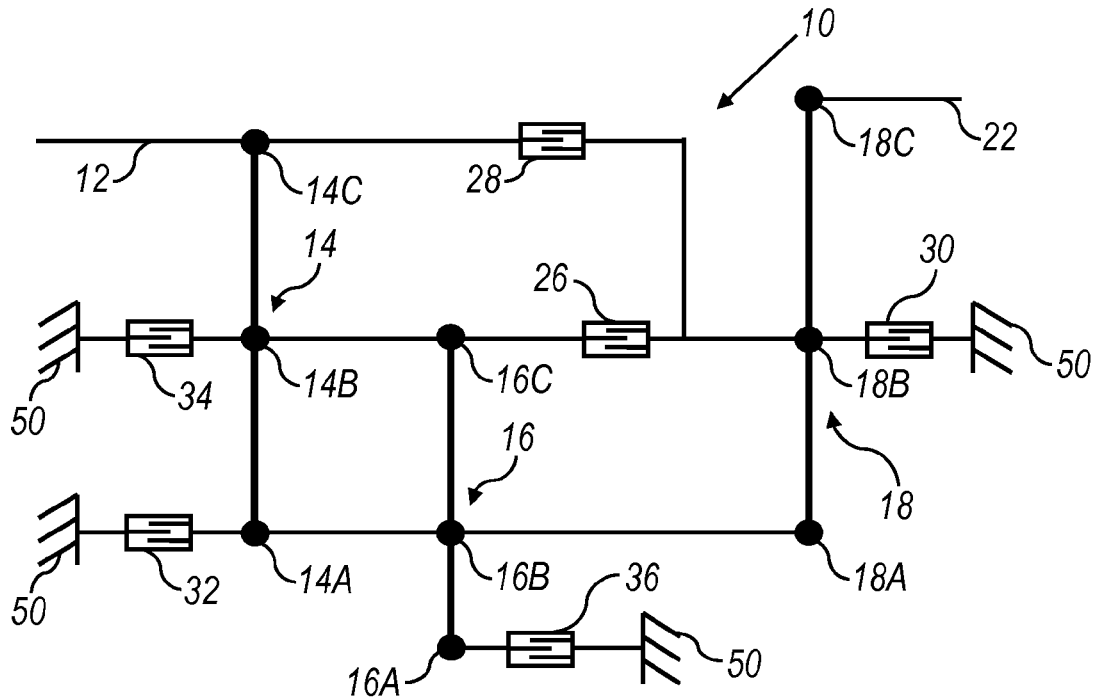
FIG. 1 is a lever diagram of an embodiment of a seven speed transmission according to the present invention.

Referring now to FIG. 1, an embodiment of a seven speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C and a third planetary gear set 18 having three nodes: a first node 18A, a second node 18B and an output shaft or member 22.

The input member 12 is coupled to the third node 14C of the first planetary gear set 14. The output member 22 is coupled to the third node 18C of the third planetary gear set 18. The first node 14A of the first planetary gear set 14 is coupled to the second node 16B of the second planetary gear set 16. The second node 14B of the first planetary gear set 14 is coupled to the third node 16C of the second planetary gear set 16. The second node 16B of the second planetary gear set 16 is coupled to the first node 18A of the third planetary gear set 18.

A first clutch 26 selectively connects the third node 16C of the second planetary gear set 16 with the second node 18B of the third planetary gear set 18. A second clutch 28 selectively connects the third node 14C of the first planetary gear set 14 with the second node 18B of the third planetary gear set 18. A first brake 30 selectively connects the second node 18B of the third planetary gear set 18 to a stationary member or transmission housing 50. A second brake 32 selectively connects the first node 14A of the first planetary gear set 14 and the second node 16B of the second planetary gear set 16 to a stationary member or transmission housing 50. A third brake 34 selectively connects the second node 14B of the first planetary gear set 14 and the third node 16C of the second planetary gear set 16 to a stationary member or transmission housing 50. A fourth brake 36 selectively connects the first node 16A of the second planetary gear set 16 to a stationary member or transmission housing 50.

Figure 2:
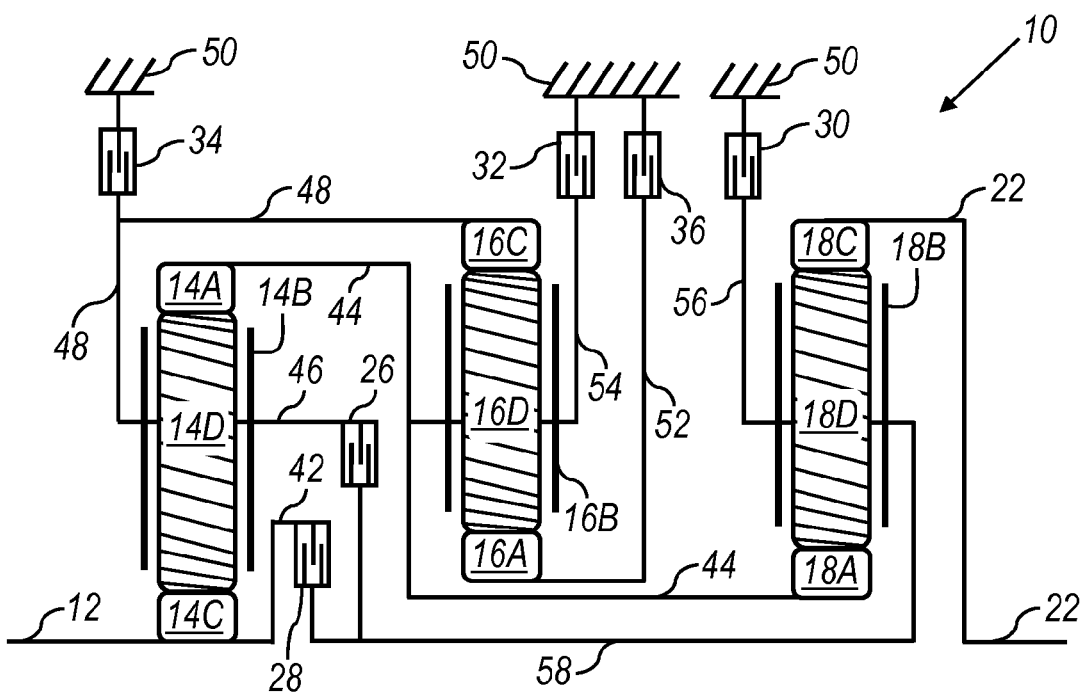
FIG. 2 is a diagrammatic illustration of an embodiment of a seven speed transmission according to the present invention.

Referring now to FIG. 2, a stick diagram presents a schematic layout of the embodiment of the seven speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or intermediate member 42 and with input shaft or member 12. The ring gear member 14A is connected for common rotation with a second shaft or intermediate member 44. The planet carrier member 14B is connected for common rotation with a third shaft or intermediate member 46 and a fourth shaft or intermediate member 48. Each of planet gears 14D are configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with a fifth shaft or intermediate member 52. The ring gear member 16C is connected for common rotation with the fourth shaft or intermediate member 48. The planet carrier member 16B is connected for common rotation with the second shaft or intermediate member 44 and with a sixth shaft or intermediate member 54. Each of the planet gears 16D are configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with second shaft or intermediate member 44. The ring gear member 18C is connected for common rotation with output shaft or member 22. The planet carrier member 18B is connected for common rotation with a seventh shaft or intermediate member 56 and with an eighth shaft or intermediate member 58. Each of the planet gears 18D are configured to intermesh with both the sun gear member 18A and the ring gear member 18C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26 and 28 and brakes 30, 32 34 and 36 allow for selective interconnection of the shafts or interconnecting members, members of the planetary gear sets and the housing. For example, the first clutch 26 is selectively engageable to connect the third shaft or intermediate member 46 with the eighth shaft or intermediate member 58. The second clutch 28 is selectively engageable to connect the first shaft or intermediate member 42 with the eighth shaft or intermediate member 58. The first brake 30 is selectively engageable to connect the seventh shaft or intermediate member 56 with the stationary element or the transmission housing 50 in order to restrict the member 56 from rotating relative to the transmission housing 50. The second brake 32 is selectively engageable to connect the sixth shaft or intermediate member 54 with the stationary element or the transmission housing 50 in order to restrict the member 54 from rotating relative to the transmission housing 50. The third brake 34 is selectively engageable to connect the fourth shaft or intermediate member 48 with the stationary element or the transmission housing 50 in order to restrict the member 48 from rotating relative to the transmission housing 50. The fourth brake 36 is selectively engageable to connect the fifth shaft or intermediate member 52 with the stationary element or the transmission housing 50 in order to restrict the member 52 from rotating relative to the transmission housing 50.

Referring now to FIG. 2 and FIG. 3, the operation of the embodiment of the seven speed transmission 10 will be described. It will be appreciated that transmission 10 is capable of transmitting torque from the input shaft or member 12 to the output shaft or member 22 in at least seven forward speed or torque ratios and at least one reverse speed or torque ratio with triple overdrive. Each forward and reverse speed or torque ratio is attained by engagement of one or more of the torque-transmitting mechanisms (i.e. first clutch 26, second clutch 28, first brake 30, second brake 32, third brake 34 and fourth brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, the first brake 30 and fourth brake 36 are engaged or activated. The first brake 30 connects the seventh shaft or intermediate member 56 with the stationary element or the transmission housing 50 in order to restrict the member 56 from rotating relative to the transmission housing 50. The fourth brake 36 connects the fifth shaft or intermediate member 52 with the stationary element or the transmission housing 50 in order to restrict the member 52 from rotating relative to the transmission housing 50. Likewise, the seven forward ratios are achieved through different combinations of clutch and brake engagement, as shown in FIG. 3.

It will be appreciated that the foregoing explanation of operation and gear states of the seven speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, and third planetary gear sets each having first, second and third members, wherein the input member is continuously directly connected to the third member of the first planetary gear set and the output member is continuously interconnected to the third member of the third planetary gear set;
a first interconnecting member continuously interconnecting the first member of the first planetary gear set with the second member of the second planetary gear set and the first member of the third planetary gear set;
a second interconnecting member continuously directly connecting the second member of the first planetary gear set with the third member of the second planetary gear set; and
six torque transmitting mechanisms each selectively engageable to interconnect at least one of the first, second, and third members with at least another of the first, second, third members and a stationary element, wherein a first of the six torque transmitting mechanisms is selectively engageable to directly connect the second member of the first planetary gear set with the second member of the third planetary gear set, and
wherein the torque transmitting mechanisms are selectively engageable in combinations of at least two to establish at least seven forward speed ratios and at least one reverse speed ratio between the input member and the output member.

2. The transmission of claim 1 wherein four of the torque transmitting mechanisms are brakes each for connecting a plurality of the first, second, and third members to the stationary element and two of the torque transmitting mechanisms are clutches each for connecting a set of the first, second, and third members to another set of the first, second, and third members.

3. The transmission of claim 1 wherein the third member of the first planetary gear set and the first member of the second and third planetary gear sets are sun gears, the second members of the first, second and third planetary gear sets are carrier members, and the first member of the first planetary gear set and the third member of the second and third planetary gear sets are ring gears.

4. The transmission of claim 1 wherein a second of the six torque transmitting mechanisms is selectively engageable to interconnect the third member of the first planetary gear set with the second member of the third planetary gear set.

5. The transmission of claim 4 wherein a third of the six torque transmitting mechanisms is selectively engageable to interconnect the second member of the third planetary gear set with the stationary element.

6. The transmission of claim 5 wherein a fourth of the six torque transmitting mechanisms is selectively engageable to interconnect the second member of the second planetary gear set with the stationary element.

7. The transmission of claim 6 wherein a fifth of the six torque transmitting mechanisms is selectively engageable to interconnect at least one of the second member of the first planetary gear set and the third member of the second planetary gear set with the stationary element.

8. The transmission of claim 7 wherein a sixth of the six torque transmitting mechanisms is selectively engageable to interconnect the first member of the second planetary gear set with the stationary element.

9. A transmission comprising:
an input member;
an output member;
first, second, and third planetary gear sets each having first, second and third members, wherein the input member is continuously directly connected to the third member of the first planetary gear set and the output member is continuously interconnected to the third member of the third planetary gear set;
a first interconnecting member continuously directly connecting the first member of the first planetary gear set with the second member of the second planetary gear set and the first member of the third planetary gear set;
a second interconnecting member continuously directly connecting the second member of the first planetary gear set with the third member of the second planetary gear set;
a first torque transmitting mechanism selectively engageable to directly connect the second member of the first planetary gear set with the second member of the third planetary gear set;
a second torque transmitting mechanism selectively engageable to directly connect the third member of the first planetary gear set with the second member of the third planetary gear set;
a third torque transmitting mechanism selectively engageable to directly connect the second member of the third planetary gear set with the stationary element;
a fourth torque transmitting mechanism selectively engageable to directly connect the second member of the second planetary gear set with the stationary element;
a fifth torque transmitting mechanism selectively engageable to directly connect at least one of the second member of the first planetary gear set and the third member of the second planetary gear set with the stationary element; and
a sixth torque transmitting mechanism selectively engageable to directly connect the first member of the second planetary gear set with the stationary element,
wherein the torque transmitting mechanisms are selectively engageable in combinations of at least two to establish at least seven forward speed ratios and at least one reverse speed ratio between the input member and the output member.

10. The transmission of claim 9 wherein the third member of the first planetary gear set and the first member of the second and third planetary gear sets are sun gears, the second members of the first, second and third planetary gear sets are carrier members, and the first member of the first planetary gear set and the third member of the second and third planetary gear sets are ring gears.

11. A transmission comprising:
an input member;
an output member;
first, second, and third planetary gear sets each having sun gear, carrier and ring gear members, wherein the input member is continuously directly connected to the sun gear member of the first planetary gear set and the output member is continuously directly connected to the ring gear member of the third planetary gear set;
a first interconnecting member continuously directly connecting the ring gear member of the first planetary gear set with the carrier member of the second planetary gear set and the sun gear member of the third planetary gear set;
a second interconnecting member continuously directly connecting the carrier member of the first planetary gear set with the ring gear member of the second planetary gear set;
a first torque transmitting mechanism selectively engageable to directly connect the carrier member of the first planetary gear set with the carrier member of the third planetary gear set;
a second torque transmitting mechanism selectively engageable to directly connect the sun gear member of the first planetary gear set with the carrier member of the third planetary gear set;
a third torque transmitting mechanism selectively engageable to directly connect the carrier member of the third planetary gear set with the stationary element;
a fourth torque transmitting mechanism selectively engageable to directly connect the carrier member of the second planetary gear set with the stationary element;
a fifth torque transmitting mechanism selectively engageable to directly connect at least one of the carrier member of the first planetary gear set and the ring gear member of the second planetary gear set with the stationary element; and
a sixth torque transmitting mechanism selectively engageable to directly connect the sun gear member of the second planetary gear set with the stationary element,
wherein the torque transmitting mechanisms are selectively engageable in combinations of at least two to establish at least seven forward speed ratios and at least one reverse speed ratio between the input member and the output member.

* * * * *